United States Patent [19]
Lai

[11] Patent Number: 5,881,713
[45] Date of Patent: Mar. 16, 1999

[54] SOLAR ROOFING ASSEMBLY

[76] Inventor: Herman Lai, No. 25, Da Gin Street, Taichung, Taiwan

[21] Appl. No.: 843,680

[22] Filed: Apr. 10, 1997

[51] Int. Cl.$^6$ .................................................. F04D 13/18
[52] U.S. Cl. ............................................................. 126/621
[58] Field of Search ................................... 126/621, 622

[56] References Cited

U.S. PATENT DOCUMENTS 4,712,338  12/1987  Trickel ..................................... 126/621
5,259,363  11/1993  Peacock et al. ......................... 126/621

FOREIGN PATENT DOCUMENTS 2383402  10/1978  France ..................................... 126/621
2408018  6/1979  France ..................................... 126/621

*Primary Examiner*—Carroll B. Dority

[57] ABSTRACT

A solar roofing assembly includes a number of solar collecting units disposed between each other so as to form a number of gaps. A number of sealing strips are engaged with the gaps for sealing the gaps and for allowing the units to form a roof of a building. The units each includes four corner portions each having a corner notch and a stud extended in the corner notch for allowing the units to be disposed adjacent to each other. A number of caps may enclose the corner notches for allowing the units to form the roof.

4 Claims, 4 Drawing Sheets

SOLAR ROOFING ASSEMBLY

BACKGROUND OF THE INVENTION

1. Field of the Invention

The present invention relates to a roof, and more particularly to a solar roofing assembly.

2. Description of the Prior Art

Typical solar collecting devices are disposed on top of the roof and may not be used as the roof. U.S. Pat. No. 5,259,363 to Peacock et al. discloses a solar roofing system. However, the system comprises a rather complicated system having a number of pipings and structural members and radiators which may not be easily assembled by the users themselves. The system should be built while the buildings are built and the system should be assembled and built by specialized person. None of the solar systems disclose a number of units that may be easily assembled to form the roof.

The present invention has arisen to mitigate and/or obviate the afore-described disadvantages of the conventional solar collecting devices.

SUMMARY OF THE INVENTION

The primary objective of the present invention is to provide a solar roofing assembly which includes a number of solar collecting units that may be easily assembled to form the roof by the users themselves.

In accordance with one aspect of the invention, there is provided a solar roofing assembly comprising at least two solar collecting units disposed adjacent to each other for forming a gap between the solar collecting units, and means for sealing the gap and for allowing the solar collecting units to form a roof of a building. The units may be easily carried and assembled together to form the roof by the users themselves.

The solar collecting units each includes at least one upper side portion having a groove formed in top, the sealing means includes a sealing strip having at least two side ribs extended downward for engaging with the grooves of the solar collecting units.

The solar collecting units each includes at least one peripheral surface having a recess, the sealing strip includes a center rib extended downward for engaging with the recesses of the solar collecting units and for sealing the gap.

In accordance with another aspect of the invention, there is provided a solar roofing assembly comprising a plurality of solar collecting units each including four corner portions, at least one of the corner portions including a corner notch and including a stud extended in the corner notch for allowing the solar collecting units to be disposed adjacent to each other, the corner notches of at least two adjacent solar collecting units forming a chamber, and means for enclosing the chamber and for allowing the solar collecting units to form a roof of a building.

The corner portions of the solar collecting units each includes a frame having the corner notch formed therein, the frames each includes a bottom plate for securing purposes.

The enclosing means includes a cap engaged in the chamber, the cap includes a coarse outer peripheral surface for force fitting in the chamber.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
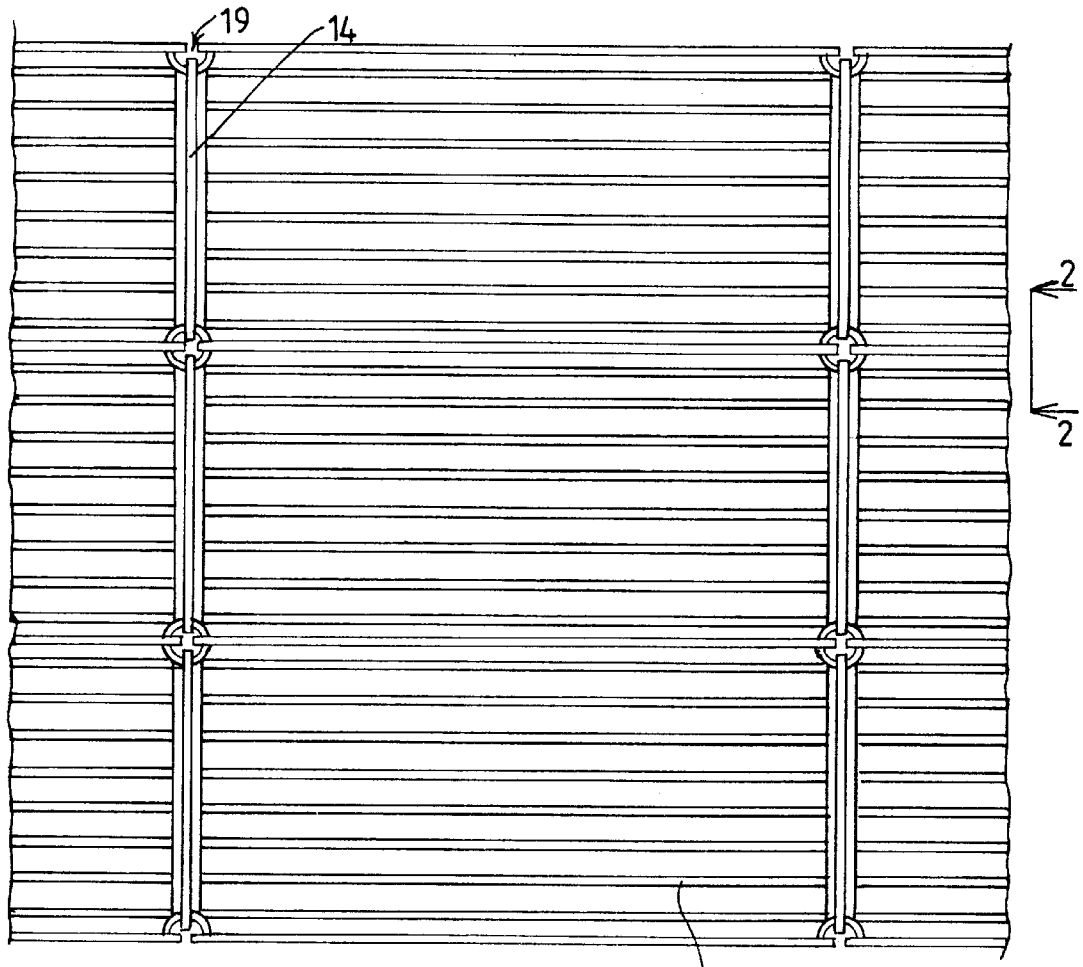
FIG. 1 is a top view of a solar roofing assembly in accordance with the present invention.
Figure 2:
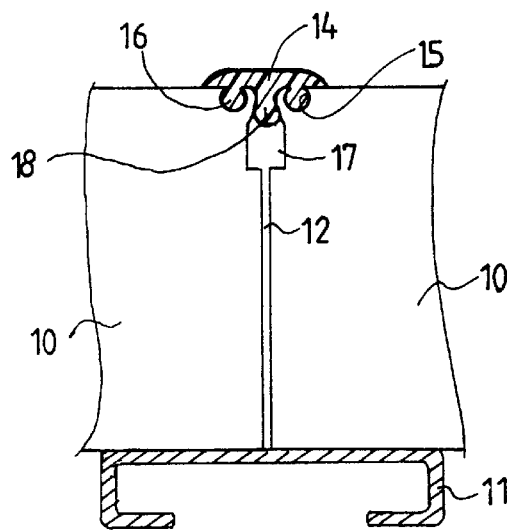
FIG. 2 is a side schematic view taken from the direction shown by the arrows 2—2 of FIG. 1.

Referring to the drawings, and initially to FIGS. 1–4, a solar roofing assembly in accordance with the present invention comprises a number of solar collecting units 10 having edge portions secured on top of beams 11 (FIG. 2) for forming a roof of a building. The solar collecting units 10 each includes four upper side portions each having a groove 15 formed in top and having a recess 17 formed in the outer peripheral surface. The two adjacent solar collecting units 10 may form a gap 12 therebetween and the recesses 17 of the two adjacent units 10 form a further groove. A sealing strip 14 includes three ribs 16, 18 for engaging with the grooves 15 and the recesses 17 so as to seal the gap 12 formed between the adjacent units 10. The units 10 each includes four corners 19.

Figure 3:
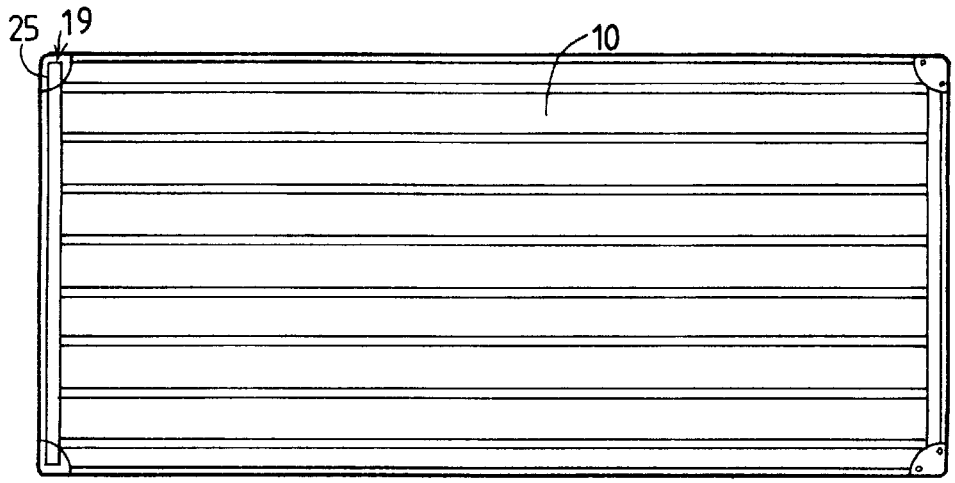
FIG. 3 is a top view of a single solar collecting unit.
Figure 4:
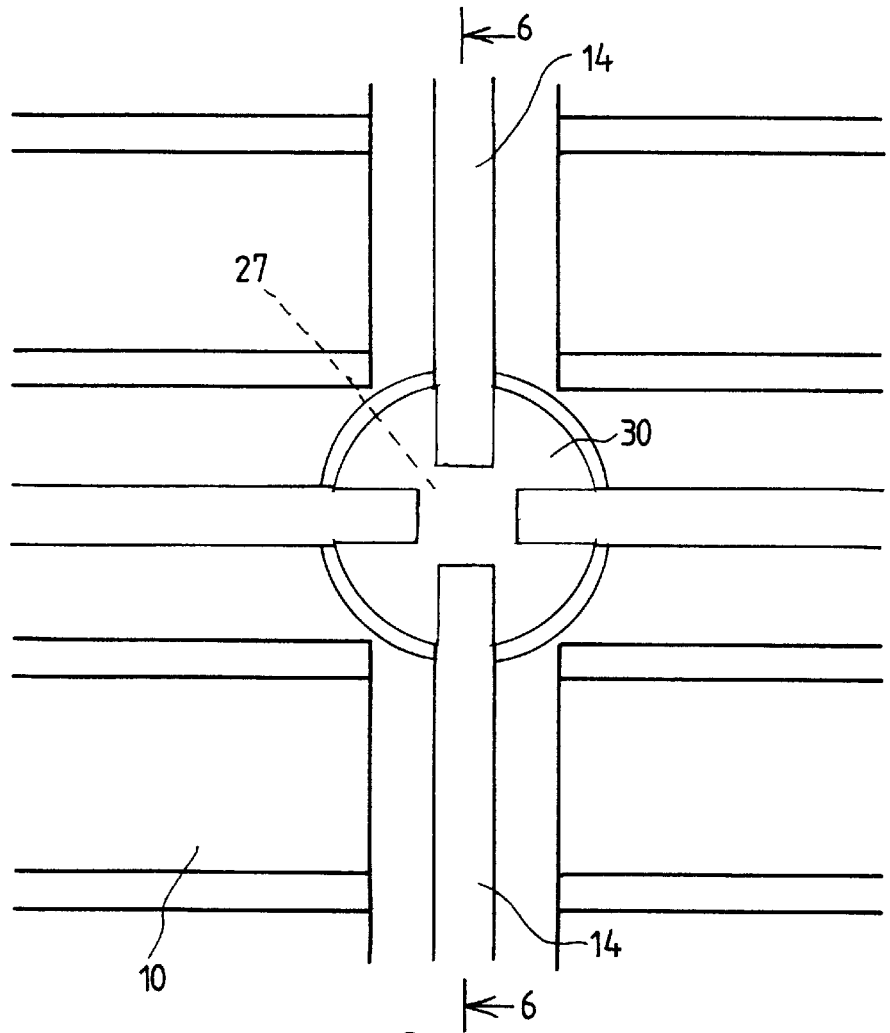
FIG. 4 is an enlarged partial top view showing the coupling portion between four solar collecting units.
Figure 5:
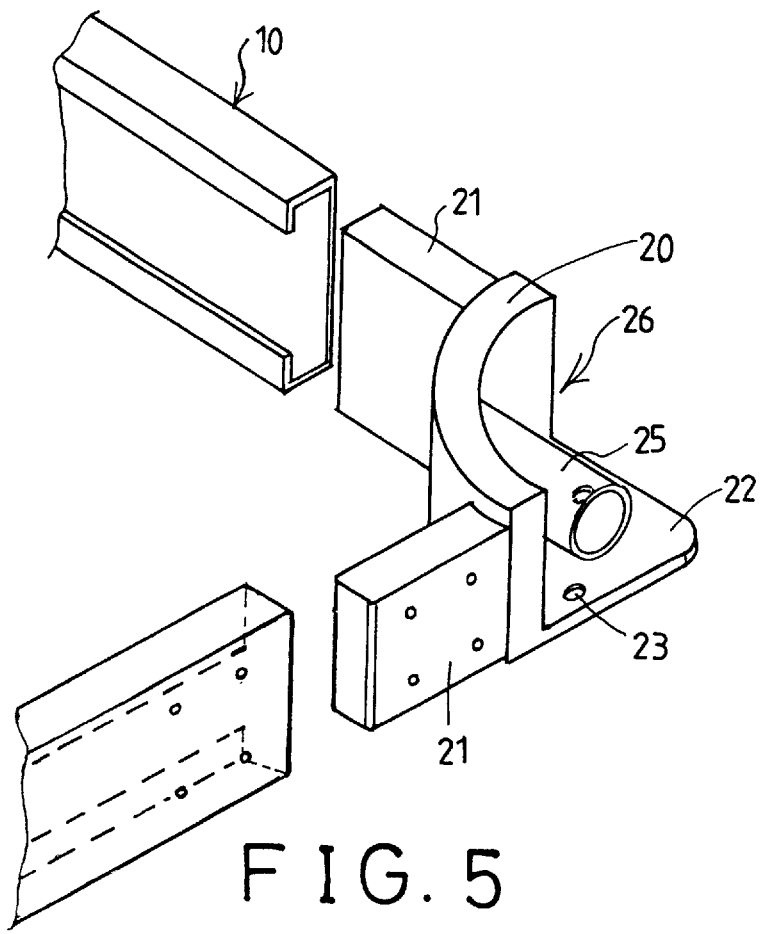
FIG. 5 is a partial exploded view showing the corner portion of the solar collecting unit.
Figure 6:
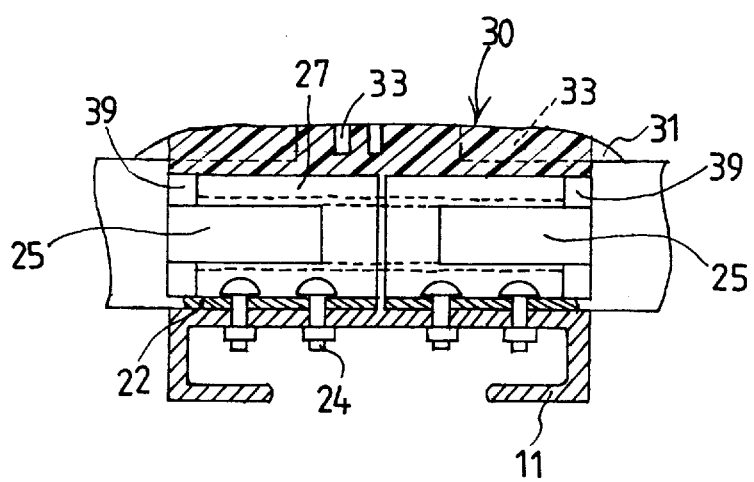
FIG. 6 is a partial cross sectional view taken along lines 6—6 of FIG. 4.

Referring next to FIGS. 5, 6 and again to FIGS. 3, 4, the corners 19 of the units 10 each includes a frame 20 having two extensions 21 for engaging and securing into the unit 10 and each includes a corner notch 26 and a bottom plate 22. The plates 22 each includes one or more holes 23 for engaging with fasteners 24 which may secure the units 10 to the beams 11. The units 10 each includes at least one (preferably two) of the corners having a stud 25 extended in the corner notch 26 for coupling to the stud 25 of the other unit 10, best shown in FIG. 6, and for allowing the units 10 to be coupled together.

It is to be noted that the studs 25 are engaged in the corner notch 26 and are not extended outward beyond the side surfaces of the units 10 such that the two adjacent units 10 may be disposed as close to each other as possible and such that the gap (12, FIG. 2) formed between the two adjacent units 10 may be easily sealed.

Figure 8:
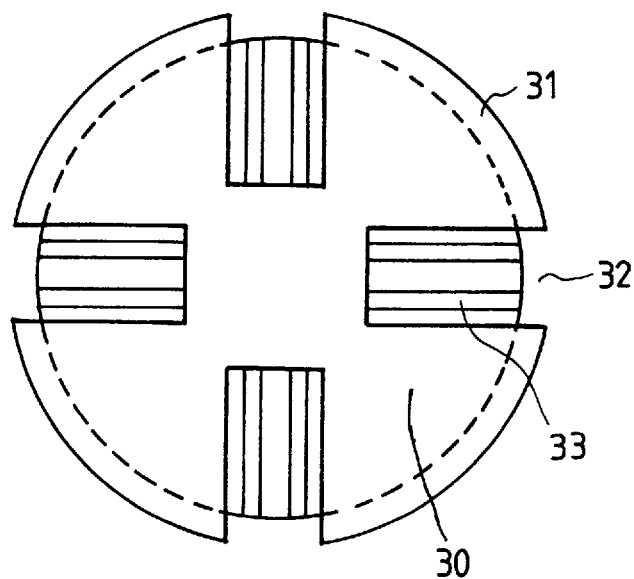
FIG. 8 is a top view of the cap.
Figure 7:
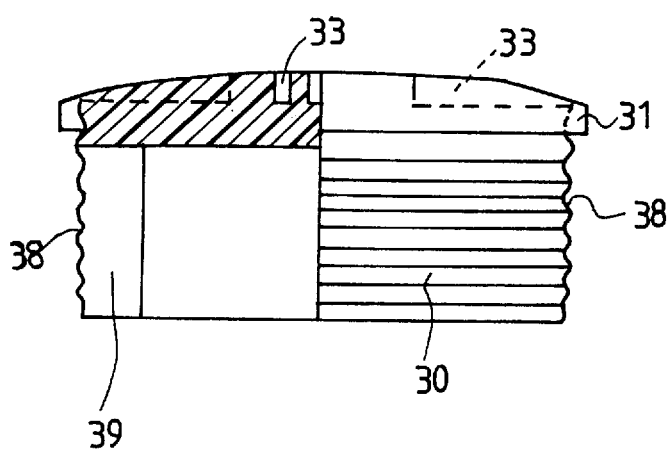
FIG. 7 is a partial cross sectional view of a cap for enclosing the corner portions of the solar collecting units.

Referring next to FIGS. 7 and 8, and again to 4 and 6, the four corner notches 26 of the four adjacent units 10 form a circular chamber 27 for engaging with a cap 30 each. The caps 30 each includes a coarse outer peripheral surface 38 for engaging with the frames 20 and for force-fitting in the chamber 27. The caps 30 each includes four flanges 31 for engaging with the units 10 (FIG. 6), and each includes four recesses 32 defined between the flanges 31 for engaging with the sealing strips 14. The caps 30 each includes four sets of grooves 33 for engaging with the ribs 16, 18 of the sealing strips 14 and for allowing the caps 30 and the strips 14 to seal the gaps formed between the units.

It is to be noted that the units 10 may thus be closely disposed adjacent to each other for allowing the sealing strips 14 and the caps 30 to seal the gaps formed between the units 10. The units 10 may be easily carried and may be easily secured on top of a building so as to form the roof of the building by the user. The units 10 normally include heat resistive bottom such that the solar roofing assembly may prevent the building from being heated in summer and may keep the building as warm as possible during winter. Two or more of the units may be assembled together so as to form the roof. The cap 30 preferably includes two or more slots 39 (FIGS. 6, 7) for engaging with the studs or other similar couplers 25.

Accordingly, the solar roofing assembly in accordance with the present invention includes a number of solar collecting units that may be easily assembled to form the roof by the users themselves.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A solar roofing assembly comprising:

at least two solar collecting units disposed adjacent to each other for forming a gap between said solar collecting units, said solar collecting units each including at least one upper side portion having a groove formed in top, said solar collecting units each including at least one peripheral surface having a recess, and means for sealing said gap and for allowing said solar collecting units to form a roof of a building, said sealing means including a sealing strip having at least two side ribs extended downward for engaging with said grooves of said solar collecting units, said sealing strip including a center rib extended downward for engaging with said recesses of said solar collecting units and for sealing said gap.

2. A solar roofing assembly comprising:

a plurality of solar collecting units each including four corner portions, at least one of said corner portions including a corner notch and including a stud extended in said corner notch for allowing said solar collecting units to be disposed adjacent to each other, said corner notches of at least two adjacent solar collecting units forming a chamber, and means for enclosing said chamber and for allowing said solar collecting units to form a roof of a building.

3. A solar roofing assembly according to claim 2, wherein said corner portions of said solar collecting units each includes a frame having said corner notch formed therein, said frames each includes a bottom plate for securing purposes.

4. A solar roofing assembly according to claim 3, wherein said enclosing means includes a cap engaged in said chamber, said cap includes a coarse outer peripheral surface for force fitting in said chamber.

* * * * *